US012131859B2

(12) United States Patent
Tabuchi et al.

(10) Patent No.: US 12,131,859 B2
(45) Date of Patent: Oct. 29, 2024

(54) COIL STRUCTURE

(71) Applicant: TDK CORPORATION, Tokyo (JP)

(72) Inventors: Masanobu Tabuchi, Tokyo (JP); Kenji Negoro, Tokyo (JP)

(73) Assignee: TDK CORPORATION, Tokyo (JP)

( * ) Notice: Subject to any disclaimer, the term of this patent is extended or adjusted under 35 U.S.C. 154(b) by 534 days.

(21) Appl. No.: 17/022,853

(22) Filed: Sep. 16, 2020

(65) Prior Publication Data

US 2021/0090783 A1 Mar. 25, 2021

(30) Foreign Application Priority Data

Sep. 24, 2019 (JP) ................................ 2019-173241

(51) Int. Cl.
*H01F 27/28* (2006.01)

(52) U.S. Cl.
CPC ................................ *H01F 27/2847* (2013.01)

(58) Field of Classification Search
CPC ................ H01F 27/2847; H01F 5/003; H01F 2017/0073; H01F 27/2804; H01F 2027/2814; H01F 2027/2861; H01F 2005/006; H01F 17/0013; H01F 27/28; H01F 2027/2809; H01F 27/2823
See application file for complete search history.

(56) References Cited

U.S. PATENT DOCUMENTS 4,616,205 A 10/1986 Praught et al.
6,559,560 B1 * 5/2003 Jin ........................ H01F 38/14 307/104
9,123,466 B2 * 9/2015 Zheng ................ H01F 27/2847
2009/0160018 A1 * 6/2009 Nabeshima ......... H01L 23/5283 257/E27.001
2013/0141205 A1 * 6/2013 Lee ........................ H01F 5/003 336/200
2015/0213948 A1 * 7/2015 Sakiyama ............ H01F 27/303 363/125
2018/0061547 A1 * 3/2018 Hanson ................ H01F 27/255
2019/0013130 A1 * 1/2019 Hamano ................ H01F 27/32
2019/0013133 A1 * 1/2019 Sasaki ................ H01F 17/0013
(Continued)

FOREIGN PATENT DOCUMENTS

CN 208045211 U * 11/2018 ......... H01F 17/0006
EP 1722381 A1 11/2006
(Continued)

OTHER PUBLICATIONS

Feb. 21, 2023 Office Action issued in Japanese Patent Application No. 2019-173241.

*Primary Examiner* — Shawki S Ismail
*Assistant Examiner* — Matthew T Sarles
(74) *Attorney, Agent, or Firm* — Oliff PLC

(57) ABSTRACT

A coil structure includes a first winding portion and a second winding portion disposed so as to overlap each other with winding axes substantially parallel to each other. The first winding portion and the second winding portion have regions overlapping each other when viewed from a winding axis direction. The second winding portion has a rising portion extending in a cross section perpendicular to a direction of a current flowing through a conductor constituting the winding portion with a directional component away from the first winding portion included.

7 Claims, 4 Drawing Sheets

(56) References Cited

U.S. PATENT DOCUMENTS

| | | | | |
|---|---|---|---|---|
| 2019/0088402 | A1* | 3/2019 | Kim | H01F 27/29 |
| 2019/0103215 | A1* | 4/2019 | Jung | H01F 17/0006 |
| 2019/0115142 | A1* | 4/2019 | Kim | H01F 41/046 |
| 2019/0180927 | A1* | 6/2019 | Moon | H01F 17/0013 |
| 2019/0189332 | A1* | 6/2019 | Kim | H01F 17/04 |
| 2019/0198215 | A1* | 6/2019 | Choi | H01F 17/0013 |
| 2019/0198223 | A1* | 6/2019 | Kim | H01F 17/04 |
| 2019/0259522 | A1* | 8/2019 | Kim | H01F 27/24 |
| 2019/0326055 | A1* | 10/2019 | Bong | H01F 27/32 |
| 2019/0341180 | A1* | 11/2019 | Ito | H01F 7/081 |
| 2019/0362886 | A1* | 11/2019 | Bong | H01F 27/2804 |
| 2021/0035735 | A1* | 2/2021 | Jiang | H01F 41/042 |
| 2021/0057137 | A1* | 2/2021 | Sasaki | H01F 17/0013 |
| 2021/0090783 | A1* | 3/2021 | Tabuchi | H01F 27/2804 |
| 2022/0130592 | A1* | 4/2022 | Sugi | H05K 1/16 |
| 2022/0130593 | A1* | 4/2022 | Sugi | H05K 1/16 |
| 2022/0310308 | A1* | 9/2022 | Arai | H01F 27/2852 |
| 2023/0022189 | A1* | 1/2023 | Eda | H01F 27/324 |

FOREIGN PATENT DOCUMENTS

| | | | |
|---|---|---|---|
| EP | 2521146 | A2 | 11/2012 |
| JP | 2015-118986 | A | 6/2015 |
| JP | 2016-039322 | A | 3/2016 |
| JP | 2018-198253 | A | 12/2018 |

* cited by examiner

COIL STRUCTURE

CROSS REFERENCE TO RELATED APPLICATIONS

This application claims priority to Japanese Patent Application No. 2019-173241 filed on Sep. 24, 2019, the entire contents of which are incorporated by reference herein.

TECHNICAL FIELD

The present disclosure relates to a coil structure.

BACKGROUND

In the related art, the coil structure that is described in Japanese Unexamined Patent Publication No. 2018-198253 is known as a coil structure. This coil structure includes a first winding portion and a second winding portion disposed so as to overlap each other with winding axes substantially parallel to each other. The first winding portion and the second winding portion overlap each other when viewed from a winding axis direction.

SUMMARY

Here, parasitic capacitance is generated in the region where the first winding portion and the second winding portion overlap each other when viewed from the winding axis direction. An increase in this parasitic capacitance may lead to a decline in (or damage to) the basic characteristics of a coil that increases in impedance at a high frequency required for the coil structure. Accordingly, it is required to reduce the parasitic capacitance between the winding portions that causes the decline (or damage).

An object of the present disclosure is to provide a coil structure that is capable of reducing parasitic capacitance between winding portions.

A coil structure according to the present disclosure includes a first winding portion and a second winding portion disposed so as to overlap each other with winding axes substantially parallel to each other. The first winding portion and the second winding portion have regions overlapping each other when viewed from a winding axis direction. The second winding portion has a rising portion extending in a cross section perpendicular to a direction of a current flowing through a conductor constituting the winding portion with a directional component away from the first winding portion included.

In the coil structure according to the present disclosure, the first winding portion and the second winding portion have the regions overlapping each other when viewed from the winding axis direction. In such a region, parasitic capacitance may be generated between the first winding portion and the second winding portion. On the other hand, the second winding portion has the rising portion extending in the cross section perpendicular to the direction of the current flowing through the conductor constituting the winding portion with the directional component away from the first winding portion included. The rising portion is capable of reducing the facing area with respect to the first winding portion at a time when viewed from the winding axis direction as compared with a part spreading perpendicularly to the winding axis direction. Accordingly, the parasitic capacitance between the winding portions can be reduced.

The rising portion may extend in parallel to the winding axis direction. In this case, the facing area between the rising portion and the first winding portion at a time when viewed from the winding axis direction is substantially equal to the thickness of the rising portion. Accordingly, it is possible to reduce the parasitic capacitance between the winding portions by reducing the facing area.

The coil structure may include two units of the second winding portion. The two second winding portions may have winding axes substantially parallel to each other. One of the second winding portions may be disposed on an inner peripheral side of the other second winding portion. In the second winding portion disposed on the inner peripheral side, the rising portion may be provided in a side end portion on an inner peripheral side of a conductor constituting the second winding portion. In the second winding portion disposed on an outer peripheral side, the rising portion may be provided in a side end portion on an outer peripheral side of a conductor constituting the second winding portion. In this case, it is possible to increase the distance of separation between the rising portion of the second winding portion and the rising portion of a third winding portion, and thus the parasitic capacitance that is generated between the rising portions can be reduced.

The first winding portion and the two second winding portions may be connected in series in any order.

According to the present disclosure, it is possible to provide a coil structure that is capable of reducing parasitic capacitance between winding portions.

DETAILED DESCRIPTION

Figure 1:
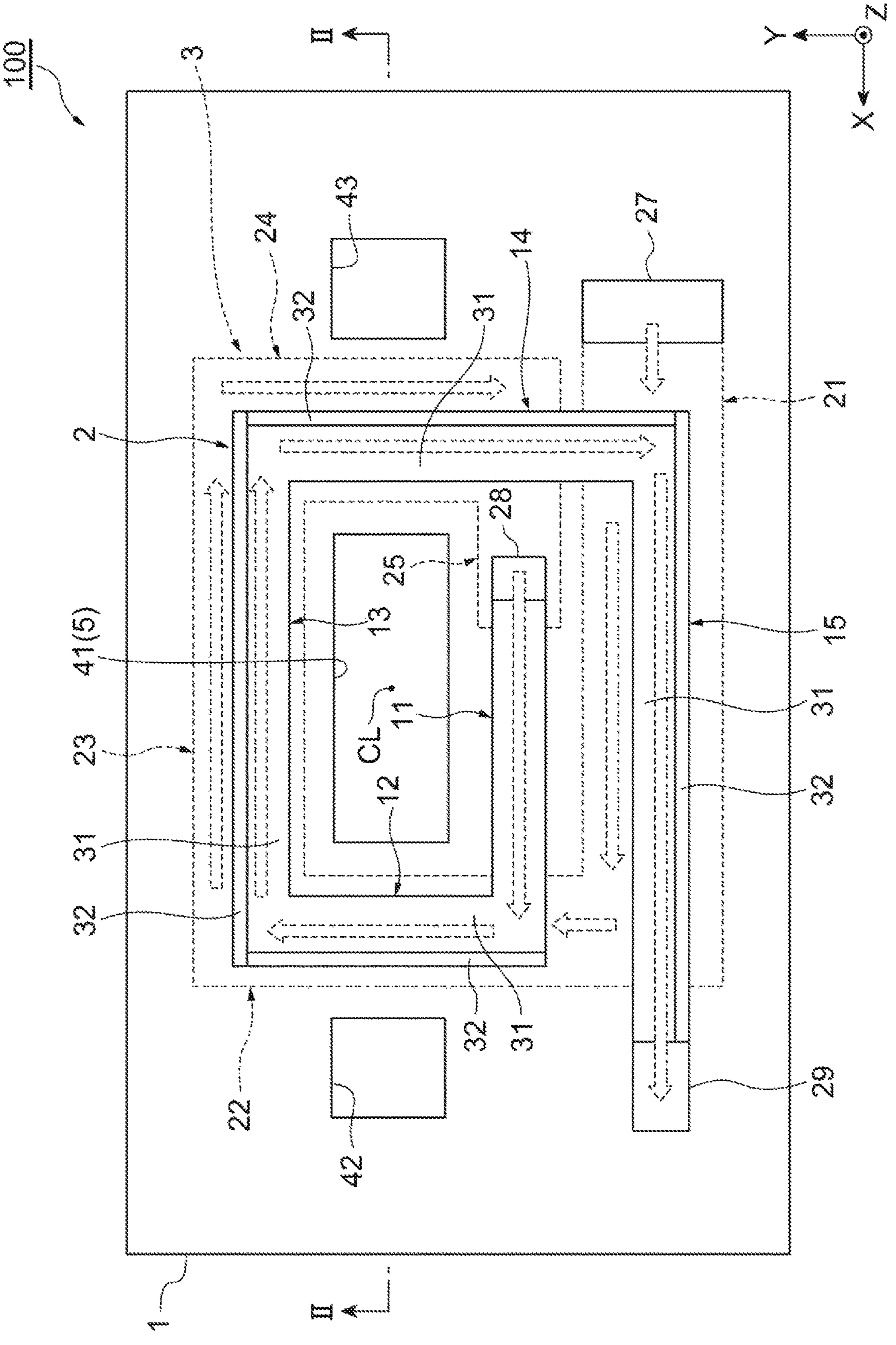
FIG. 1 is a plan view illustrating a coil structure according to an embodiment of the present disclosure.

A coil structure according to an embodiment of the present disclosure will be described with reference to FIG. 1. FIG. 1 is a plan view illustrating a coil structure 100 according to the embodiment of the present disclosure.

As illustrated in FIG. 1, the coil structure 100 is a structure mounted on a substrate 1. The coil structure 100 includes a pattern winding portion 3 (first winding portion) formed in the substrate 1 and a sheet metal winding portion 2 (second winding portion) disposed on the substrate 1. It should be noted that an X axis is set in a direction parallel to the surface of the substrate 1, a Y axis is set in a direction parallel to the surface of the substrate 1 and orthogonal to the X-axis direction, and a Z axis is set in a direction orthogonal to the X axis and the Y axis. It should be noted that the direction from the inner portion of the substrate 1 to the surface is the positive side in the Z-axis direction. The Z-axis direction corresponds to the winding axis direction in which the winding axes of the sheet metal winding portion 2 and the pattern winding portion 3 extend. It should be noted that a middle space portion 41 into which a core (not illustrated) is inserted is a winding middle portion 5 in the description of the present embodiment. The pattern winding portion 3 and the sheet metal winding portion 2 have a winding structure wound around the winding middle portion 5. The winding middle portion 5 has a rectangular shape having a longitudinal direction in the X-axis direction.

The pattern winding portion 3 is configured by a conductor pattern being formed in the substrate 1. The pattern winding portion 3 is formed in the substrate 1. Alternatively, the pattern winding portion 3 may be formed on the surface of the substrate 1. The pattern winding portion 3 has side portions 21 to 25 between a winding starting end portion 27 and a joining portion 28. The side portions 21 to 25 are disposed so as to surround the winding middle portion 5. Although the position is not particularly limited, the winding starting end portion 27 is formed at a position separated from the winding middle portion 5 to the negative side in the X-axis direction and the negative side in the Y-axis direction. The joining portion 28 is where the pattern winding portion 3 and the sheet metal winding portion 2 are joined, the terminal end of the pattern winding portion 3, and the starting end of the sheet metal winding portion 2. The joining portion 28 is formed at a position on the negative side in the Y-axis direction with respect to the winding middle portion 5. The joining portion 28 is formed at a position on the positive side in the X-axis direction and the Y-axis direction as compared with the winding starting end portion 27.

The side portion 21 extends straight from the winding starting end portion 27 to the positive side in the X-axis direction. The side portion 21 extends to the positive side in the X-axis direction as compared with the winding middle portion 5. The side portion 22 extends straight from the end portion of the side portion 21 on the positive side in the X-axis direction to the positive side in the Y-axis direction. The side portion 22 extends to the positive side in the Y-axis direction as compared with the winding middle portion 5. The side portion 23 extends straight from the end portion of the side portion 22 on the positive side in the Y-axis direction to the negative side in the X-axis direction. The side portion 23 extends to the negative side in the X-axis direction as compared with the winding middle portion 5. The side portion 24 extends straight from the end portion of the side portion 23 on the negative side in the X-axis direction to the negative side in the Y-axis direction. The side portion 24 extends to the negative side in the Y-axis direction as compared with the winding middle portion 5 and extends to the front side of the side portion 21. The side portion 25 extends straight from the end portion of the side portion 24 on the negative side in the Y-axis direction to the positive side in the X-axis direction. The side portion 25 extends to the joining portion 28 and is connected to the joining portion 28.

The sheet metal winding portion 2 is a winding member disposed on the positive side in the Z-axis direction, which is the winding axis direction, with respect to the pattern winding portion 3. In this manner, the pattern winding portion 3 and the sheet metal winding portion 2 are disposed in an overlapping manner such that the winding axes are substantially parallel. It should be noted that the winding axis of the pattern winding portion 3 and the winding axis of the sheet metal winding portion 2 are disposed at substantially the same position in the description of the embodiment. Accordingly, it is assumed that a winding axis CL (see FIGS. 1 and 2) is a winding axis common to the pattern winding portion 3 and the sheet metal winding portion 2. Alternatively, the winding axis of the pattern winding portion 3 and the winding axis of the sheet metal winding portion 2 may be disposed at positions displaced from each other insofar as the performance is not affected. The sheet metal winding portion 2 is disposed at a position separated from the surface of the substrate 1 to the positive side in the Z-axis direction (see FIG. 2). The sheet metal winding portion 2 is configured by a plate material as a base material being cut into a winding shape and bending (described later) being performed. The sheet metal winding portion 2 and the pattern winding portion 3 have regions overlapping each other when viewed from the Z-axis direction. The sheet metal winding portion 2 has side portions 11 to 15 between the joining portion 28 and a winding terminal end portion 29. The side portions 11 to 15 surround the winding middle portion 5 and are disposed so as to overlap the side portions 21 to 25 of the pattern winding portion 3 when viewed from the Z-axis direction. Although the position is not particularly limited, the winding terminal end portion 29 is formed at a position separated from the winding middle portion 5 to the positive side in the X-axis direction and the negative side in the Y-axis direction. The winding terminal end portion 29 is disposed at a position separated from the winding starting end portion 27 to the positive side in the X-axis direction.

The side portion 11 extends straight from the joining portion 28 to the positive side in the X-axis direction. The side portion 11 extends to the positive side in the X-axis direction as compared with the winding middle portion 5 and extends to a position overlapping the side portion 22. The side portion 12 extends straight from the end portion of the side portion 11 on the positive side in the X-axis direction to the positive side in the Y-axis direction. The side portion 12 extends to the positive side in the Y-axis direction as compared with the winding middle portion 5 and extends to a position overlapping the side portion 23 in a state of overlapping the side portion 22. The side portion 13 extends straight from the end portion of the side portion 12 on the positive side in the Y-axis direction to the negative side in the X-axis direction. The side portion 13 extends to the negative side in the X-axis direction as compared with the winding middle portion 5 and extends to a position overlapping the side portion 24 in a state of overlapping the side portion 23. The side portion 14 extends straight from the end portion of the side portion 13 on the negative side in the X-axis direction to the negative side in the Y-axis direction. The side portion 14 extends to the negative side in the Y-axis direction as compared with the winding middle portion 5 and extends to a position overlapping the side portion 21 in a state of overlapping the side portion 24. The side portion 15 extends straight from the end portion of the side portion 14 on the negative side in the Y-axis direction to the positive side in the X-axis direction. The side portion 15 extends to the winding terminal end portion 29 and is connected to the winding terminal end portion 29 in a state of overlapping the side portion 21.

The side portion 11 is smaller in width-direction dimension than the side portion 25 and is disposed so as to overlap the side portion 25 in the entire width direction near the negative-side end portion in the X-axis direction. It should be noted that the "width direction" refers to a direction orthogonal to the longitudinal direction of each side portion and parallel to the XY plane. The side portion 12 is smaller in width-direction dimension than the side portion 22 and is disposed so as to overlap the side portion 22 in the entire width direction over the entire length. The side portion 13 is smaller in width-direction dimension than the side portion 23 and is disposed so as to overlap the side portion 23 in the entire width direction over the entire length. The side portion 14 is smaller in width-direction dimension than the side portion 24 and is disposed so as to overlap the side portion 24 in the entire width direction over substantially the entire length. However, in a vicinity of the end portion of the side portion 14 on the negative side in the Y-axis direction, the side portion 14 overlaps the side portion 21 instead of the side portion 24. The side portion 15 is smaller in width-direction dimension than the side portion 21 and is disposed so as to overlap the side portion 21 in the entire width direction over substantially the entire length. However, in a vicinity of the end portion of the side portion 15 on the positive side in the X-axis direction, the side portion 15 does not overlap the side portion 21.

The broken-line arrows in FIG. 1 indicate current paths. In other words, the current from the winding starting end portion 27 flows through the pattern winding portion 3 to the joining portion 28 in the order of the side portions 21, 22, 23, 24, and 25. The current from the joining portion 28 flows through the sheet metal winding portion 2 to the winding terminal end portion 29 in the order of the side portions 11, 12, 13, 14, and 15.

It should be noted that a space portion 42 is formed at a position separated from the space portion 41, which is the winding middle portion 5, to the positive side in the X-axis direction across the side portions 12 and 22 in the substrate 1. In addition, in the substrate 1, a space portion 43 is formed at a position separated from the space portion 41, which is the winding middle portion 5, to the negative side in the X-axis direction across the side portions 14 and 24. In a case where the core (not illustrated) is a tripod including outer legs such as an E-shaped tripod, the two outer legs are inserted into the space portions 42 and 43 in the same manner as the middle leg is inserted into the space portion 41.

Figure 2:
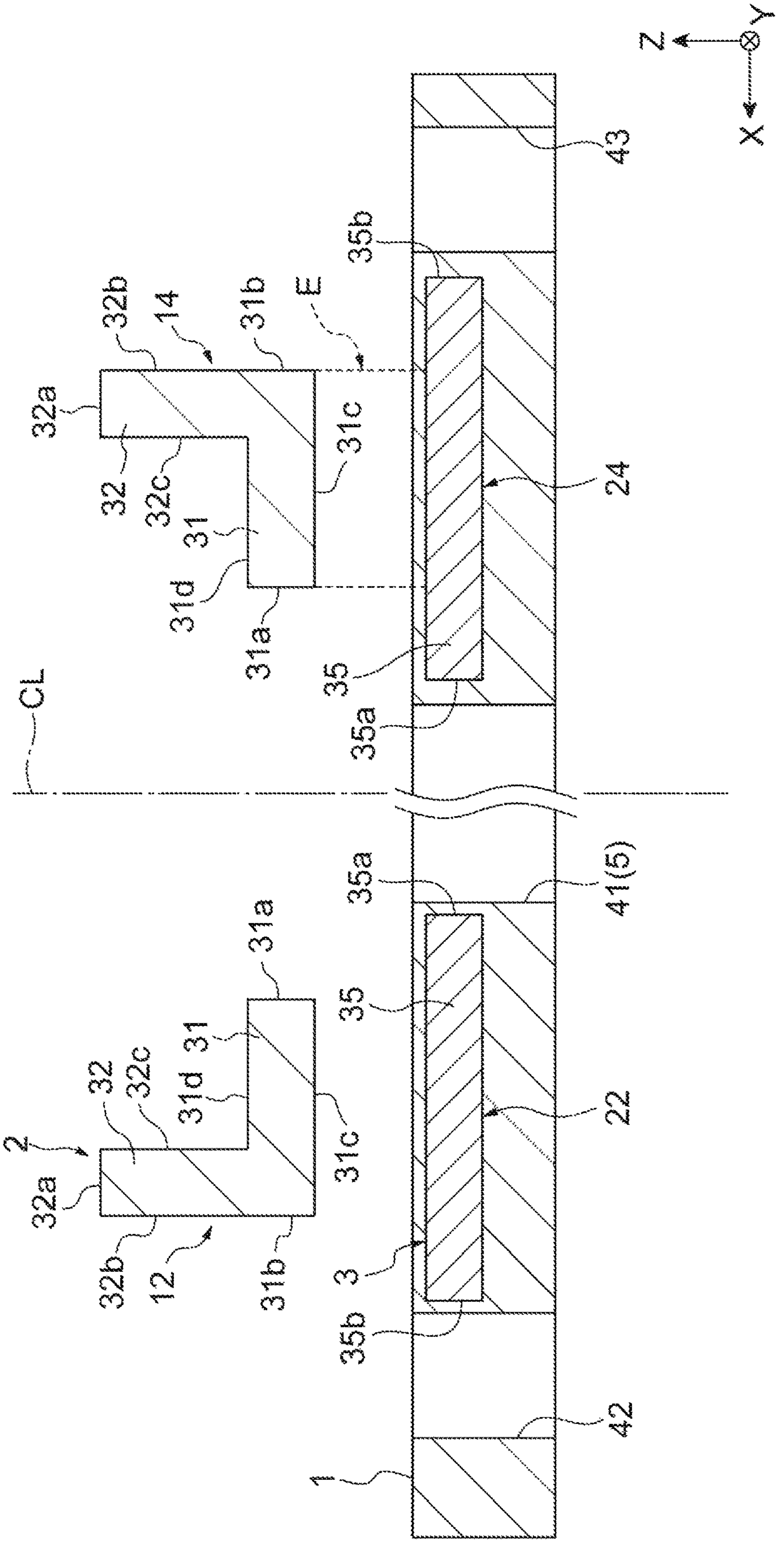
FIG. 2 is a cross-sectional view taken along line II-II of FIG. 1.

Next, the cross-sectional shape of the sheet metal winding portion 2 will be described in detail with reference to FIG. 2. FIG. 2 is a cross-sectional view taken along line II-II of FIG. 1. It should be noted that the side portions 12 and 14 are illustrated in FIG. 2, the side portions 13 and 15 have the same configuration, and thus description thereof will be omitted. As illustrated in FIG. 2, the sheet metal winding portion 2 has a facing portion 31 and a rising portion 32.

The facing portion 31 is a part facing the pattern winding portion 3. The facing portion 31 extends in the longitudinal direction of each of the side portions 12 and 14 in a state of being spread so as to be substantially parallel to the pattern winding portion 3, that is, substantially parallel to the XY plane. The facing portion 31 has a side end portion 31*a* on the inner peripheral side, a side end portion 31*b* on the outer peripheral side, a main surface 31*c* on the negative side in the Z-axis direction, and a main surface 31*d* on the positive side in the Z-axis direction. It should be noted that each of the side portions 21 to 25 of the pattern winding portion 3 is configured only by a facing portion 35 facing the facing portion 31 substantially in parallel. The side end portion 31*a* on the inner peripheral side of the facing portion 31 is disposed on the outer peripheral side as compared with a side end portion 35*a* on the inner peripheral side of the facing portion 35. The side end portion 31*b* on the outer peripheral side of the facing portion 31 is disposed on the inner peripheral side as compared with a side end portion 35*b* on the outer peripheral side of the facing portion 35.

The rising portion 32 is a rising part extending in a cross section perpendicular to the direction of the current flowing through the conductor that constitutes the sheet metal winding portion 2 with a directional component away from the pattern winding portion 3 included. Here, the Z-axis direction corresponds to the direction away from the pattern winding portion 3. Accordingly, in a cross-sectional view, the rising portion 32 extends with a directional component along the Z-axis direction included. In the present embodiment, the rising portion 32 extends in parallel to the Z-axis direction. In other words, the rising portion 32 extends in a state of having only the Z-axis direction as the directional component. The rising portion 32 is provided in the outer peripheral side end portion 31*b* of the facing portion 31. The rising portion 32 is provided so as to rise from the side end portion 31*b* of the facing portion 31 to the positive side in the Z-axis direction. The rising portion 32 has an upper end portion 32*a*, a main surface 32*b* on the outer peripheral side, and a main surface 32*c* on the inner peripheral side. The rising portion 32 is provided over substantially the entire region of the facing portion 31 in the longitudinal direction (see FIG. 1).

The rising portion 32 is formed by a flat plate-shaped sheet metal member (cut member) being bent so as to be bent perpendicularly to the facing portion 31. Specifically, in the sheet metal member that is yet to be bent, the main surface 31*c* and the main surface 32*b* are on the same plane and the main surface 31*d* and the main surface 32*c* are on the same plane. By the bending being performed, the main surface 32*b* becomes perpendicular to the main surface 31*c* and the main surface 32*c* becomes perpendicular to the main surface 31*d*.

As a result of this configuration, only the main surface 31*c* of the facing portion 31 faces the facing portion 35 of the pattern winding portion 3 in the Z-axis direction in the side portions 12 and 14 of the sheet metal winding portion 2. Accordingly, in a case where parasitic capacitance is generated between the sheet metal winding portion 2 and the pattern winding portion 3, the parasitic capacitance is likely to be generated between the main surface 31*c* of the facing portion 31 and the facing portion 35 of the pattern winding portion 3. On the other hand, the main surfaces 32*b* and 32*c* of the rising portion 32 are flat surfaces that spread perpendicularly to the facing portion 35 of the pattern winding portion 3. Accordingly, substantially no parasitic capacitance is generated between the rising portion 32 and the pattern winding portion 3.

The ratio of the rising portion 32 to the cross-sectional area of the side portions 12 and 14 of the sheet metal winding portion 2 is not particularly limited. Although the rising portion 32 occupies 50% of the cross-sectional area of the side portions 12 and 14 in FIG. 2, the ratio may be 50% or more or 50% or less. In addition, from the viewpoint of suppressing parasitic capacitance, it is preferable that the rising portion 32 occupies 30% or more of the cross-sectional area of the side portions 12 and 14.

Next, the action and effect of the coil structure 100 according to the present embodiment will be described.

In the coil structure 100, the pattern winding portion 3 and the sheet metal winding portion 2 have the regions overlapping each other when viewed from the Z-axis direction (winding axis direction). In such a region, parasitic capacitance may be generated between the pattern winding portion 3 and the sheet metal winding portion 2. On the other hand, the sheet metal winding portion 2 has the rising portion 32 extending in the cross section perpendicular to the direction of the current flowing through the conductor that constitutes the sheet metal winding portion 2 with the directional component away from the pattern winding portion 3 included. The rising portion 32 is capable of reducing the facing area with respect to the pattern winding portion 3 at a time when viewed from the Z-axis direction as compared with the facing portion 31 spreading perpendicularly to the Z-axis direction. Specifically, as illustrated in FIG. 2, the facing area between the sheet metal winding portion 2 and the pattern winding portion 3 in the side portion 14 is the area at the location of a facing region E defined by the side end portion 31*a* and the side end portion 31*b* of the facing portion 31. The rising portion 32 is contained in the facing region E, and thus the rising portion 32 does not contribute to an increase in facing area. On the other hand, the cross-sectional area of the side portion 14 of the sheet metal winding portion 2 is the cross-sectional area of the rising portion 32 that is added with respect to the facing portion 31. In this manner, the facing area can be kept within the range of the facing portion 31 while the cross-sectional area is allowed to be larger than in the case of the facing portion 31 being alone and a large current is allowed to flow. Accordingly, the parasitic capacitance between the winding portions 2 and 3 can be reduced as compared with the magnitude of the current that can be passed.

The rising portion 32 extends in parallel to the Z-axis direction. In this case, the facing area between the rising portion 32 and the pattern winding portion 3 at a time when viewed from the Z-axis direction is substantially equal to the thickness of the rising portion 32. In the present embodiment, the rising portion 32 at a time when viewed from the Z-axis direction falls within the range of the facing portion 31, and thus the rising portion 32 does not substantially contribute to an increase in facing area. Accordingly, it is possible to reduce the parasitic capacitance between the winding portions 2 and 3 by reducing the facing area.

The present disclosure is not limited to the embodiment described above.

In the embodiment described above, the rising portion 32 is formed by the sheet metal being bent. However, manufacturing methods are not particularly limited. In an alternative configuration, the rising portion 32 may be fixed to the facing portion 31 with the facing portion 31 and the rising portion 32 configured by separate plate-shaped members.

In addition, the rising portion 32 may be partially formed in the longitudinal direction although the rising portion 32 is formed in substantially the entire region in the longitudinal direction in each of the side portions 11 to 15. Still, it is preferable that the rising portion 32 is formed in a region of 50% or more of the entire length of the side portion. In addition, the rising portion 32 may be provided in the side end portion 31*a* on the inner peripheral side of the facing portion 31. In addition, some of the side portions may lack the rising portion 32.

The cross-sectional shape of the sheet metal winding portion 2 is not limited to the embodiment described above. Any cross-sectional shape can be adopted without departing from the spirit of the present disclosure.

Figure 3A:
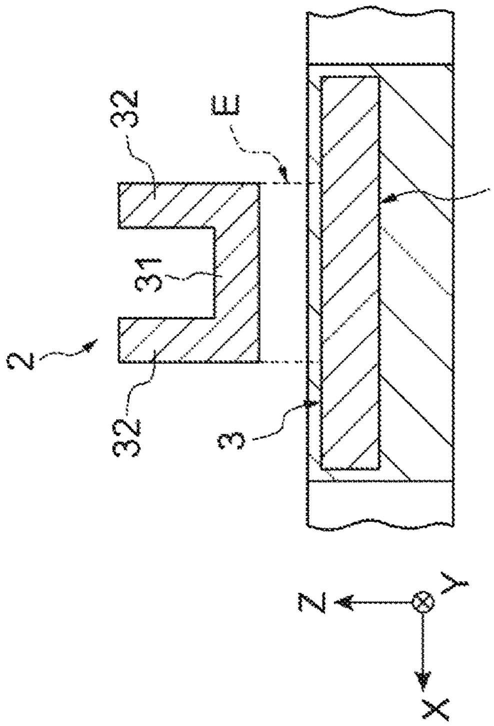
FIG. 3A, FIG. 3B, and FIG. 3C are cross-sectional views illustrating a cross-sectional shape of a sheet metal winding portion of a coil structure according to a modification example.

For example, the rising portions 32 may be formed on both width-direction sides of the facing portion 31 as illustrated in FIG. 3A. At this time, the rising portions 32 on both sides may have different heights.

Figure 3B:
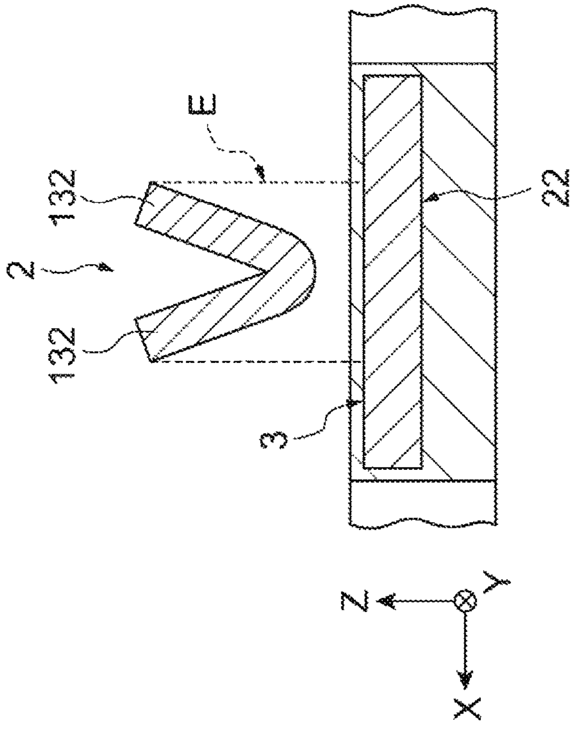

In the embodiment described above, the rising portion 32 extends in parallel to the Z-axis direction. However, a rising portion including a directional component other than the Z-axis direction may also be adopted. Rising portions 132 inclined with respect to the Z-axis direction by including a directional component orthogonal to the Z-axis direction (here, a directional component in the X-axis direction) may be adopted as illustrated in FIG. 3B. In addition, the sheet metal winding portion 2 may have a V-shaped cross-sectional shape by being configured only by the rising portions 132. In this case, the facing region E is defined by the upper end portion of one of the rising portions 132 and the upper end portion of the other rising portion 132.

Figure 3C:
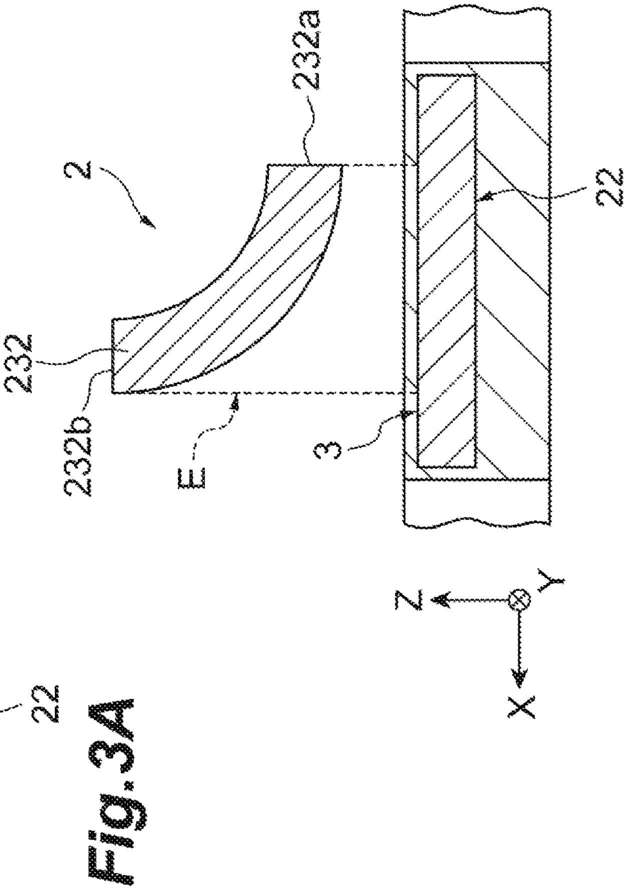

A curved rising portion 232 may also be adopted as illustrated in FIG. 3C. In such a configuration, the rising portion 232 extends from a lower end portion 232*a* in such a manner that the directional component in the X-axis direction is larger than the directional component in the Z-axis direction, the directional component in the Z-axis direction gradually increases, and the rising portion 232 extends in such a manner that the directional component in the Z-axis direction is larger than the directional component in the X-axis direction near an upper end portion 232*b*. In this case, the facing region E is defined by the lower end portion 232*a* and the upper end portion 232*b*.

Figure 4A:
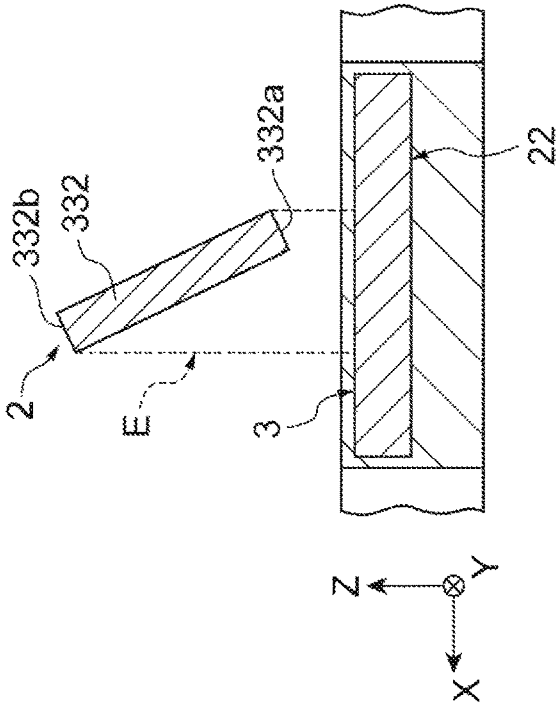
FIG. 4A, FIG. 4B, and FIG. 4C are cross-sectional views illustrating a cross-sectional shape of a sheet metal winding portion of a coil structure according to a modification example.
Figure 4B:
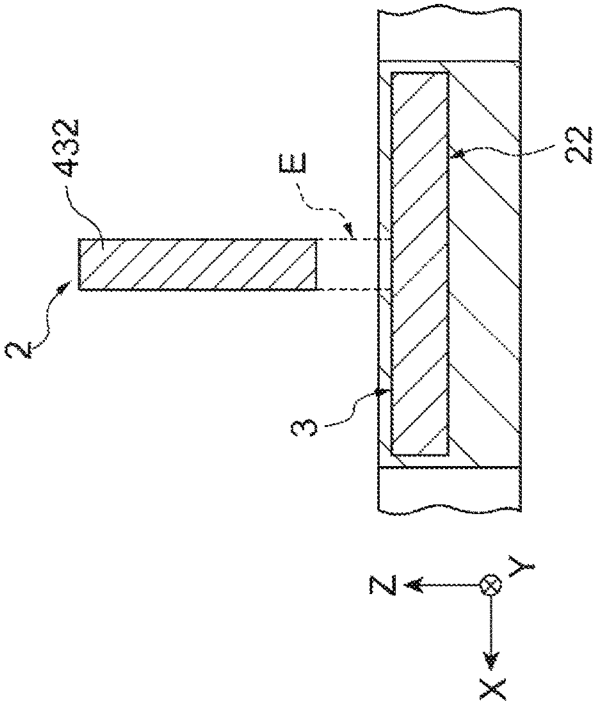

In addition, as illustrated in FIGS. 4A and 4B, the cross-sectional shape of the sheet metal winding portion 2 may not be curved. As illustrated in FIG. 4A, the cross-sectional shape of the sheet metal winding portion 2 may be configured only by a rising portion 332 that is in a state of straight inclination with respect to the Z-axis direction. In this case, the facing region E is defined by a lower end portion 332*a* and an upper end portion 332*b*. As illustrated in FIG. 4B, the cross-sectional shape of the sheet metal winding portion 2 may be configured only by a rising portion 432 in a state of straight extension with respect to the Z-axis direction. In this case, the facing region E is defined by the thickness of the rising portion 432.

Figure 4C:
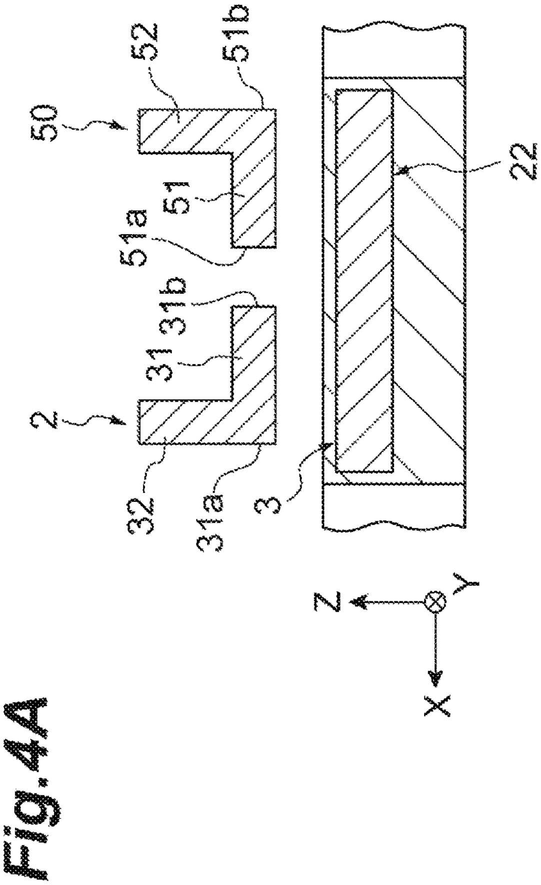

In addition, as illustrated in FIG. 4C, the coil structure may be provided with the sheet metal winding portion 2 and a sheet metal winding portion 50 (second winding portion) with respect to the pattern winding portion 3. The winding axes of the two sheet metal winding portions 2 and 50 are substantially parallel. In this case, the sheet metal winding portion 50 is disposed so as to be aligned with the sheet metal winding portion 2 in the circumferential direction (here, the X-axis direction). The pattern winding portion 3 and the two sheet metal winding portions 2 and 50 may be connected in series in any order. The sheet metal winding portion 50 has a rising portion 52 and a facing portion 51 facing the pattern winding portion 3. In the sheet metal winding portion 2, the rising portion 32 is provided in the side end portion 31*a* of the facing portion 31 on the side opposite to the sheet metal winding portion 50. In the sheet metal winding portion 50, the rising portion 52 is provided in a side end portion 51*b* of the facing portion 51 on the side opposite to the sheet metal winding portion 2. In this case, it is possible to increase the distance of separation between the rising portion 32 of the sheet metal winding portion 2 and the rising portion 52 of the sheet metal winding portion 50, and thus the parasitic capacitance that is generated between the rising portions 32 and 52 can be reduced.

A coil structure comprising a first winding portion and a second winding portion disposed so as to overlap each other with winding axes substantially parallel to each other, wherein the first winding portion and the second winding portion have regions overlapping each other when viewed from a winding axis direction, the second winding portion has a rising portion extending in a cross section perpendicular to a direction of a current flowing through a conductor constituting the winding portion with a directional component away from the first winding portion included, the rising portion extends in parallel to the winding axis direction, the coil structure comprises two units of the second winding portion, the two second winding portions have winding axes substantially parallel to each other, one of the second winding portions is disposed on an inner peripheral side of the other second winding portion, in the second winding portion disposed on the inner peripheral side, the rising portion is provided in a side end portion on an inner peripheral side of a conductor constituting the second winding portion, and in the second winding portion disposed on an outer peripheral side, the rising portion is provided in a side end portion on an outer peripheral side of a conductor constituting the second winding portion.

A coil structure comprising a first winding portion and a second winding portion disposed so as to overlap each other with winding axes substantially parallel to each other, wherein the first winding portion and the second winding portion have regions overlapping each other when viewed from a winding axis direction, the second winding portion has a rising portion extending in a cross section perpendicular to a direction of a current flowing through a conductor constituting the winding portion with a directional component away from the first winding portion included, the rising portion extends in parallel to the winding axis direction, and the first winding portion and the two second winding portions are connected in series in any order.

A coil structure comprising a first winding portion and a second winding portion disposed so as to overlap each other with winding axes substantially parallel to each other, wherein the first winding portion and the second winding portion have regions overlapping each other when viewed from a winding axis direction, the second winding portion has a rising portion extending in a cross section perpendicular to a direction of a current flowing through a conductor constituting the winding portion with a directional component away from the first winding portion included, the rising portion extends in parallel to the winding axis direction, the coil structure comprises two units of the second winding portion, the two second winding portions have winding axes substantially parallel to each other, one of the second winding portions is disposed on an inner peripheral side of the other second winding portion, in the second winding portion disposed on the inner peripheral side, the rising portion is provided in a side end portion on an inner peripheral side of a conductor constituting the second winding portion, in the second winding portion disposed on an outer peripheral side, the rising portion is provided in a side end portion on an outer peripheral side of a conductor constituting the second winding portion, and the first winding portion and the two second winding portions are connected in series in any order.

REFERENCE SIGNS LIST

2: sheet metal winding portion (second winding portion), 3: pattern winding portion (first winding portion), 50: sheet metal winding portion (second winding portion), 31, 51: facing portion, 32, 52, 132, 232, 332, 432: rising portion, 100: coil structure.

What is claimed is:

1. A coil structure comprising a first winding portion and a second winding portion disposed so as to overlap each other with winding axes substantially parallel to each other, wherein the first winding portion and the second winding portion have regions overlapping each other when viewed from a winding axis direction, and the second winding portion has a rising portion that extends perpendicular to or at an angle with respect to the first winding portion, wherein the first winding portion has a base facing portion that faces the second winding portion and extends between side end portions of the first winding portion in a direction perpendicular to the winding axis of the first winding portion, with a width in the direction perpendicular to the winding axis of the first winding portion that is greater than a height of the first winding portion in a direction parallel to the winding axis, and wherein, when the coil structure is viewed from the winding axis direction, for the regions overlapping each other when viewed from the winding axis direction, the rising portion is located within outer edges of the first winding portion, and the rising portion extends away from the first winding portion with respect to a portion of the second winding portion that faces the first winding portion.

2. The coil structure according to claim 1, wherein the rising portion extends in parallel to the winding axis direction.

3. The coil structure according to claim 1, comprising two units of the second winding portion, wherein the two second winding portions have winding axes substantially parallel to each other, one of the second winding portions is disposed on an inner peripheral side of the other second winding portion, in the second winding portion disposed on the inner peripheral side, the rising portion is provided in a side end portion on an inner peripheral side of a conductor constituting the second winding portion, and in the second winding portion disposed on an outer peripheral side, the rising portion is provided in a side end portion on an outer peripheral side of a conductor constituting the second winding portion.

4. The coil structure according to claim 3, wherein the first winding portion and the two second winding portions are connected in series in any order.

5. The coil structure according to claim 1, wherein the second winding portion has a facing portion, and the facing portion is perpendicular to the rising portion.

6. The coil structure according to claim 1, wherein the rising portion is perpendicular to the first winding portion.

7. A coil structure comprising a first winding portion and a second winding portion disposed so as to overlap each other with winding axes substantially parallel to each other, wherein the first winding portion and the second winding portion have regions overlapping each other when viewed from a winding axis direction, and the second winding portion has a rising portion that extends at an angle with respect to the first winding portion, wherein the first winding portion has a base facing portion that faces the second winding portion and extends between side end portions of the first winding portion in a direction perpendicular to the winding axis of the first winding portion, with a width in the direction perpendicular to the winding axis of the first winding portion that is greater than a height of the first winding portion in a direction parallel to the winding axis, and wherein, when the coil structure is viewed from the winding axis direction, for the regions overlapping each other when viewed from the winding axis direction, the rising portion is located within outer edges of the first winding portion, and the rising portion, when viewed in a cross-sectional view, has a V-shape, with a vertex of the V-shape pointed towards the first winding portion.

* * * * *